United States Patent [19]

Schrock et al.

[11] Patent Number: 5,646,858

[45] Date of Patent: Jul. 8, 1997

[54] HEAT APPORTIONMENT SYSTEM

[75] Inventors: Clifford B. Schrock, Portland, Oreg.; Herbert E. Engel, Burlington, Mass.

[73] Assignees: Analytical Systems Engineering Corp., Burlington, Mass.; Cablebus Systems Corporation, Portland, Oreg.

[21] Appl. No.: 315,285

[22] Filed: Sep. 29, 1994

Related U.S. Application Data

[63] Continuation of Ser. No. 209,648, Mar. 10, 1994, abandoned.

[51] Int. Cl.⁶ ............................ G06F 17/60
[52] U.S. Cl. .................... 364/464.22; 165/11.1; 364/557
[58] Field of Search ................ 165/11.1; 236/36, 236/37; 340/568, 572; 364/464.01, 557

[56] References Cited

U.S. PATENT DOCUMENTS

| | | | |
|---|---|---|---|
| 4,002,890 | 1/1977 | Welin | 364/464.04 |
| 4,049,044 | 9/1977 | Cohen | 165/11 |
| 4,150,371 | 4/1979 | Scaglione | 340/568 |
| 4,306,293 | 12/1981 | Marathe | 364/557 |
| 4,329,681 | 5/1982 | Parsons | 340/568 |
| 4,335,848 | 6/1982 | Eidejus | 237/8 R |
| 4,343,042 | 8/1982 | Schrock et al. | 455/5 |
| 4,363,441 | 12/1982 | Feinberg | 236/36 |
| 4,412,647 | 11/1983 | Lampert | 236/36 |
| 4,473,307 | 9/1984 | Dobronyi et al. | 374/39 |
| 4,482,006 | 11/1984 | Anderson | 165/11 R |
| 4,484,620 | 11/1984 | McHugh | 165/11 |
| 4,509,679 | 4/1985 | Longini | 236/94 |
| 4,558,958 | 12/1985 | Pena et al. | 374/39 |
| 4,568,934 | 2/1986 | Allgood | 364/483 X |
| 4,577,977 | 3/1986 | Pejsa | 374/39 |
| 4,591,988 | 5/1986 | Klima et al. | 364/510 X |
| 4,629,115 | 12/1986 | Lampert et al. | 236/36 |
| 4,639,876 | 1/1987 | Deeds | 364/483 |
| 4,648,123 | 3/1987 | Schrock | 455/67 |
| 4,675,828 | 6/1987 | Winston | 364/483 |
| 4,802,115 | 1/1989 | Ginn | 364/900 |
| 4,933,633 | 6/1990 | Allgood | 364/483 X |
| 5,237,307 | 8/1993 | Gritton | 340/572 |
| 5,416,468 | 5/1995 | Baumann | 340/573 |

FOREIGN PATENT DOCUMENTS

| | | |
|---|---|---|
| 2548766 | 11/1985 | European Pat. Off. . |
| 2584766 | 1/1985 | France . |
| 2644584 | 9/1990 | France . |
| 2925116 | 1/1981 | Germany . |
| 3130591 | 2/1983 | Germany . |
| 3703387 | 8/1987 | Germany . |

OTHER PUBLICATIONS

DIN 4713, Teil 3, "Heating costs based on consumption: instruments, registering heating water consumption, operating with auxiliary energy", Jan. 1989.

Draft European Standard, for "Heat Apportionment Systems", No. prEN 835:1992.

*Primary Examiner*—Edward R. Cosimano
*Attorney, Agent, or Firm*—Wolf, Greenfield & Sacks, P.C.

[57] ABSTRACT

Apportioning energy costs among units by sensing a heat exchange for at least one heat exchanger in each unit. In response to this sensing, a value corresponding to an amount of heat provided by the heat exchanger is determined for each unit. Each value is transmitted to a central location, and they are processed to apportion energy cost for each unit as a function of the respective value. Total values for each heat exchanger can be summed to provide a summation value corresponding to a total amount of heat provided to the unit over time, and energy costs can be apportioned as a function of this summation value for each unit. A probe that includes a probe body and an electrical heat sensing element mounted in the probe body. A tamper detecting mechanism responds to forces applied to the probe and interacts with a conductive lead of the probe to provide an electrical tampering indication. The probe may be attached by an adhesive to a radiator, and it can include a structural weakness, which can cause breakage of the lead.

64 Claims, 11 Drawing Sheets

HEAT APPORTIONMENT SYSTEM

This application continuation of application Ser. No. 08/209,648, filed Mar. 10, 1994, now abandoned.

FIELD OF THE INVENTION

This invention relates to methods and apparatus for apportioning heating energy costs among units within multi-unit buildings.

BACKGROUND OF THE INVENTION

A microcomputer system has been proposed to permit individuals to control and calculate their share of heating costs. In this proposed prior art system, which is described in "Dispositif de Comptage Individuel et d'Autoregulation de Chauffage Collectif," French Pat. No. 2,548,766 of Pierre Mumbach, published on Jan. 11, 1985, each apartment has its own microcomputer with a keyboard and display. Each microcomputer is connected to an ambient temperature sensor within the apartment, to probes located on the radiators in the apartment, and to a central computer housed in a common area that contains the building's heating installation. The central computer is also connected to an exterior temperature sensor and to a heating control circuit. This proposed system is said to permit display in each apartment of the temperature, of the daily price of heat consumption, and of the costs of heat consumption for the season, while permitting the user to regulate the heating in the apartment.

Retrofitting a metering system to accurately measure the actual cost of energy consumed in each unit of a commonly heated building, however, can be quite expensive, and may present significant difficulties.

SUMMARY OF THE INVENTION

In general, the invention features apportioning energy costs among units by sensing a heat exchange for at least one heat exchanger in each unit. In response to this sensing, a value corresponding to an amount of heat provided by the heat exchanger is determined for each unit. Each value is transmitted to a central location, and they are processed to apportion energy cost for each unit as a function of the respective value. Total values for each heat exchanger can be summed to provide a summation value corresponding to a total amount of heat provided to the unit over time, and energy costs can be apportioned as a function of this summation value for each unit, without requiring any absolute heat transfer determinations.

In preferred embodiments, the same type of sensor can be used for different heat exchangers, and every heat exchanger in each unit can be sensed. Tampering with the method can be detected, and an indication that the tampering has occurred can be transmitted to the central location and presented to the user. Transmission can be over a local bus and a bidirectional cable television link. Results can also be stored upon detection of a power failure.

In another general aspect, the invention features a probe that includes a probe body and an electrical heat sensing element mounted in the probe body. A tamper detecting mechanism responds to forces applied to the probe and interacts with a conductive lead of the probe to provide an electrical tampering indication. The probe may be attached by an adhesive to a radiator, and it can include a structural weakness, which can cause breakage of the lead.

In general, this invention is advantageous in that it can be installed or retrofitted on a variety of heating systems. Installation personnel may only need to stock, transport, and install a single type of temperature probe, since such a probe can be installed on a variety of different radiators. Probes according to another aspect of the invention can resist tampering by a user attempting to defeat the system. Attempts to by-pass or cool the sensor, or attempts to tamper with the master unit in the apartment can also be detected and reported. The system can perform the tamper detection, metering, and billing functions at a remote location, which can reduce or eliminate the cost and inconvenience of on-site meter reading. Furthermore, the system of the invention can be made to be resistant to power loss, and the human interface presented to the occupant of the unit can be quite simple to use, preferably requiring only a single button.

The above advantages, and others which will be apparent from the description below, make this invention particularly advantageous in apportioning heat among multi-unit buildings such as apartment buildings. In addition, systems according to the invention are particularly well-suited to be retrofitted into buildings where no method of allocating heat between units presently exists.

DETAILED DESCRIPTION

Figure 1:
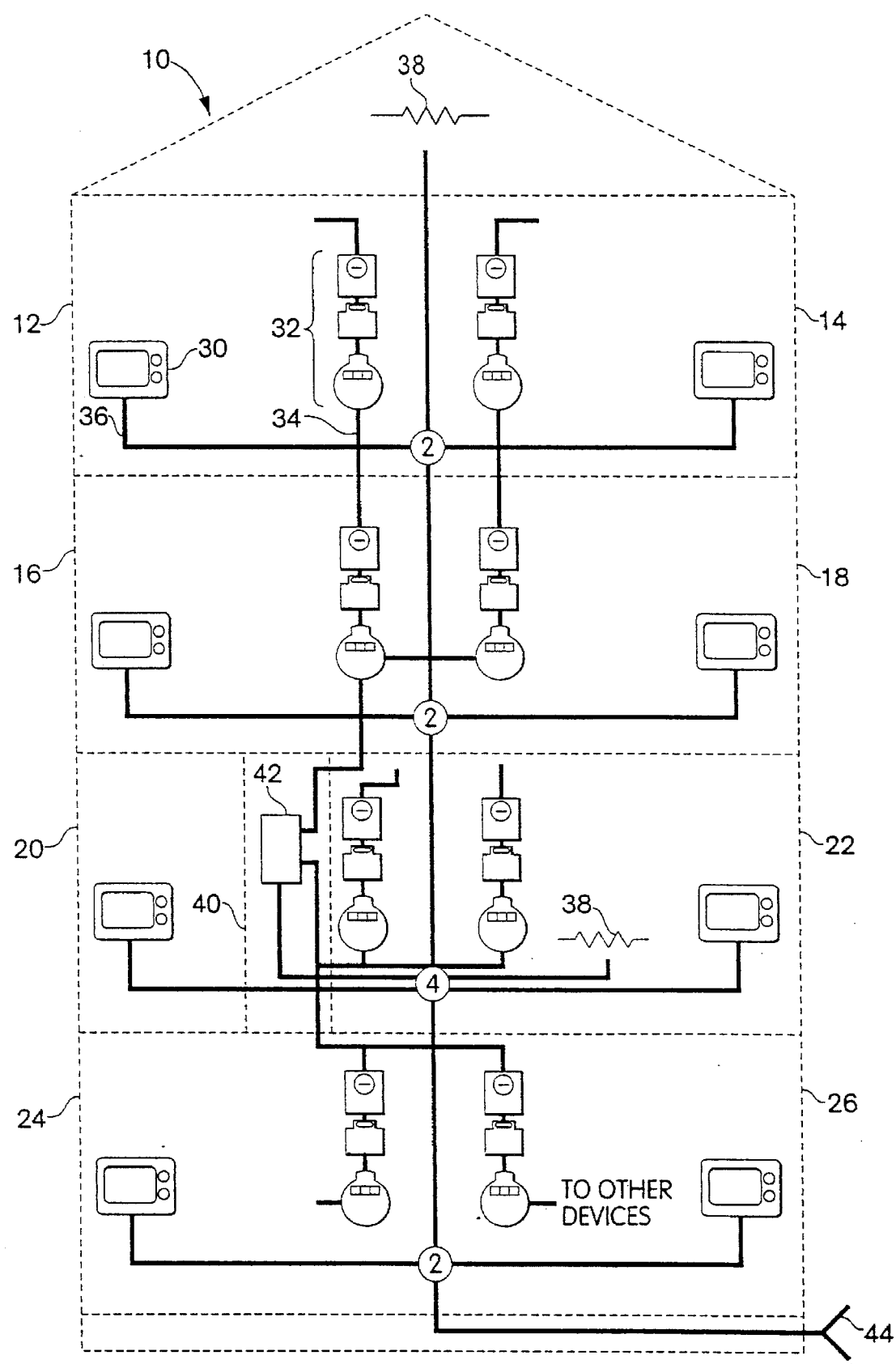
FIG. 1 is a block diagram of a multi-unit building for installation of the heat apportionment system of the invention.

Referring to FIG. 1, in one embodiment of the invention an apartment building 10 includes a series of apartments 12, 14, 16, 18, 20, 22, 24, 26. A first apartment 12 contains a television set 30 connected to the building's cable television wiring 36 (CATV). A local bus 34 is also provided to the apartment, such as a "HomeBus" local bus, which is a four-wire bidirectional serial bus that employs a six bit address and a variable-length data word. This local bus may be connected to one or more monitoring system terminals 32 in the apartment, such as an electric meter, a gas meter, a water meter, a smoke detector, a "panic button", and a burglar alarm system. The other apartments 14, 16, 18, 20, 22, 24, and 26 can be similarly equipped.

The local bus 34 is connected to a central control unit 42 for the building. This unit can be one of several units that act as an interface between the local bus and the CATV wiring 36, which is fed into the building via a CATV trunk 44. The central control unit may be a Eurodata Bus Control Data Terminal—Multiple Dwelling Unit (CDT-MDU), available from Analytical Systems Engineering Corporation, of Burlington, Mass. In general, the central control unit relays communications between the monitoring systems on the local bus and a central computer, which is connected to the CATV system at a remote location. For further general information on this type of communication system, see Schrock, BI-DIRECTIONAL DATA TRANSMISSION AND CONTROL SYSTEM, U.S. Pat. No. 4,343,042, issued Aug. 3, 1982, and REMOTE LEVEL MEASUREMENT SYSTEM FOR USE IN A MULTI-TERMINAL COMMUNICATION SYSTEM, U.S. Pat. No. 4,648,123, issued Mar. 3, 1987, which are herein incorporated by reference. Other communication methods could also be used in the context of the invention, such as telephonic or radio links.

Figure 2:
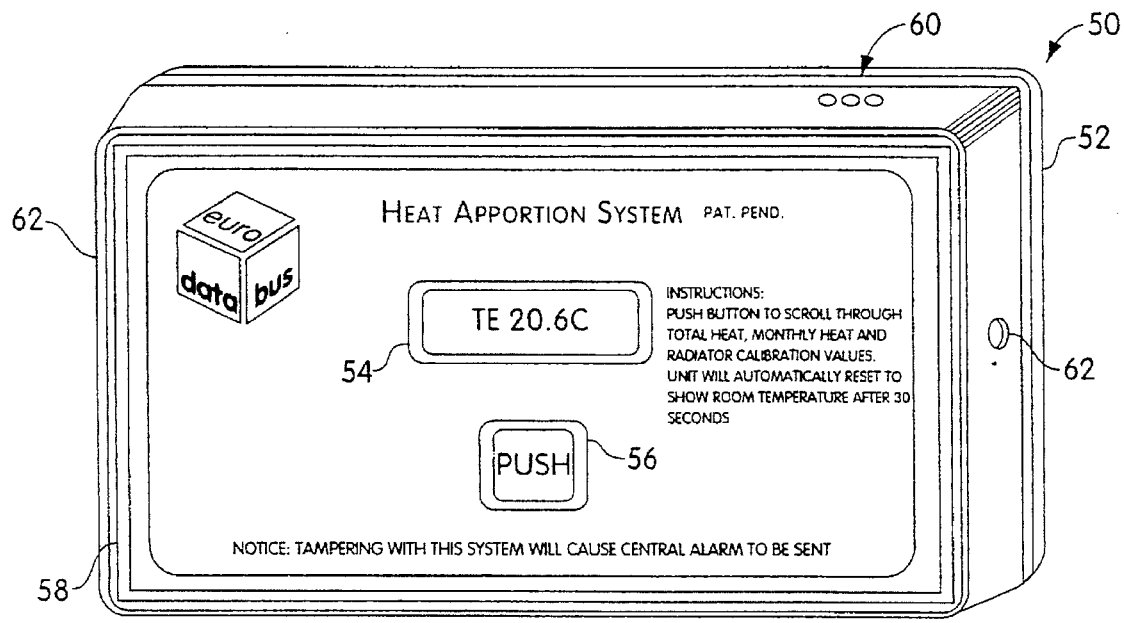
FIG. 2 is a front view of an apportionment unit for installation in the building of FIG. 1.

Referring to FIGS. 1 and 2, one type of terminal 32 that can be connected to the building's local bus 34, is a dwelling heat apportionment unit 50. This unit includes a housing 52, which is mounted on a wall in the apartment 12. A cover 58 sits on the front of the housing, and supports a display screen 54, such as an LCD screen, and a user push-button 56 ("Scroll"), such as a membrane button. Cover installation screw holes 62 are provided in the sides of the housing, and a series of ambient temperature sensor air holes 60 are provided in the top and bottom of the housing.

Figure 3:
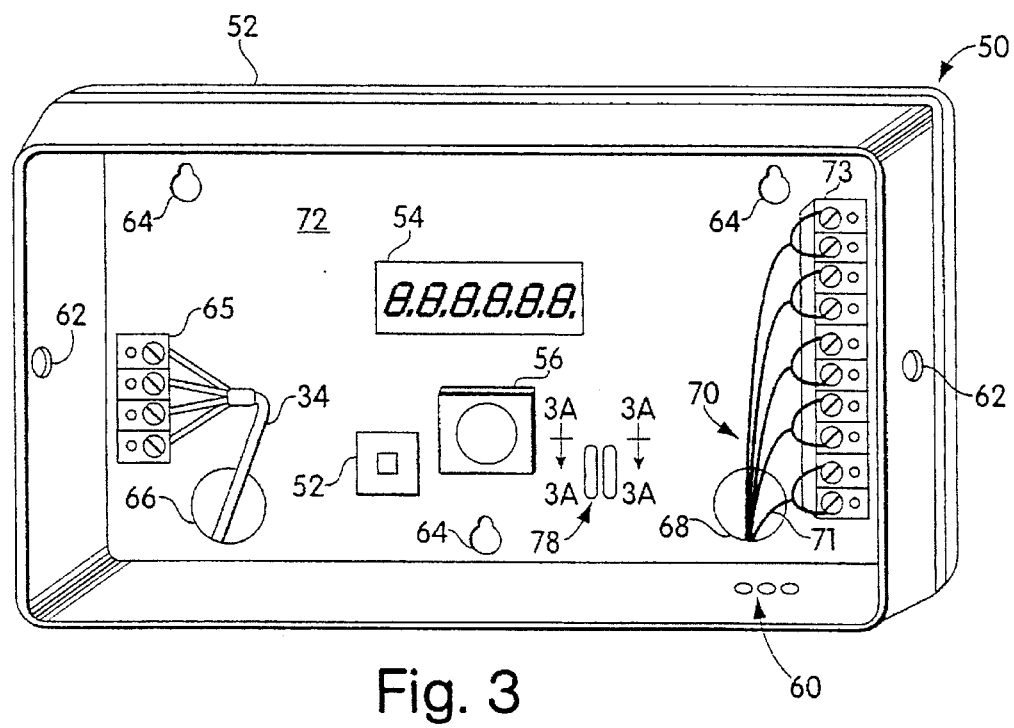
FIG. 3 is a front view of the apportionment unit of FIG. 2, with its cover removed.
Figure 3A:
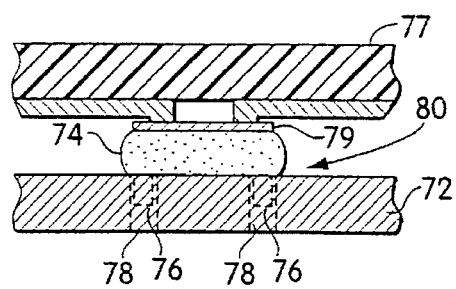
FIG. 3A is a cross-section defined by the lines marked "3A" in FIG. 3, and which shows the detail of the tamper detection switch of the apportionment unit of FIG. 2.

Referring to FIGS. 3 and 3A, the apportionment unit housing 52 further includes a back panel 72 defining three mounting holes 64, a bus port hole 66 for receiving the local bus 34, and a probe wire port hole 68 for receiving radiator probe wires 70. As shown in FIG. 3A, a tamper sensor 80 is mounted on the inside surface of the back panel. This sensor includes a foam block 74 with conductive (e.g., copper) foil 79 mounted on it, and a pair of legs 76 mounted opposite the foil and which pass through a pair of leg holes 78 in the back panel.

The purpose of the tamper sensor 80 is to detect opening of the housing 52. This is achieved by aligning the foil 79 with a pair of contacts on a printed circuit board 77, which sits in the housing. The foam biases the foil against the contacts and thereby keeps a watchdog circuit closed. Disturbing the circuit board breaks the circuit, causing the unit to report a tamper condition. Other types of switches can also be used for this watchdog function.

Figure 4:
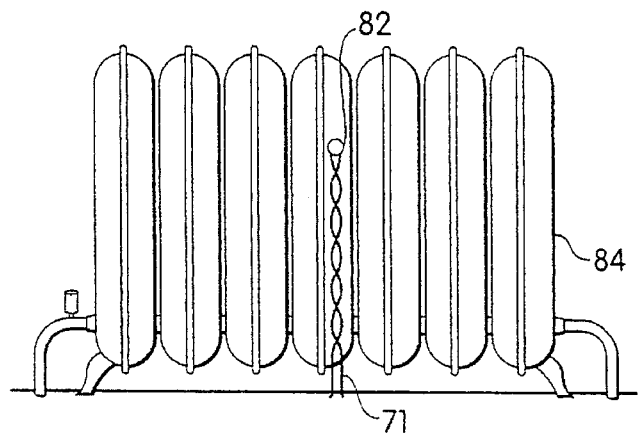
FIG. 4 is a front view of a radiator in the building of FIG. 1, with a temperature probe installed.

Referring to FIG. 4, a temperature sensing probe 82 can be installed on one or more radiators 84 in the apartment. In the case of a steam or water radiator, the probe is preferably located approximately half way along the length of the radiator, and about three-quarters from the bottom of the radiator. This location has been found by empirical testing to exhibit an average temperature for steam or water radiators. The probes weigh around 300 grams and are equipped with 20 cm #22 strand color-coded teflon pigtail leads 71 that are to be spliced to class D low voltage room wiring and connected back to the apportionment unit.

Figure 5:
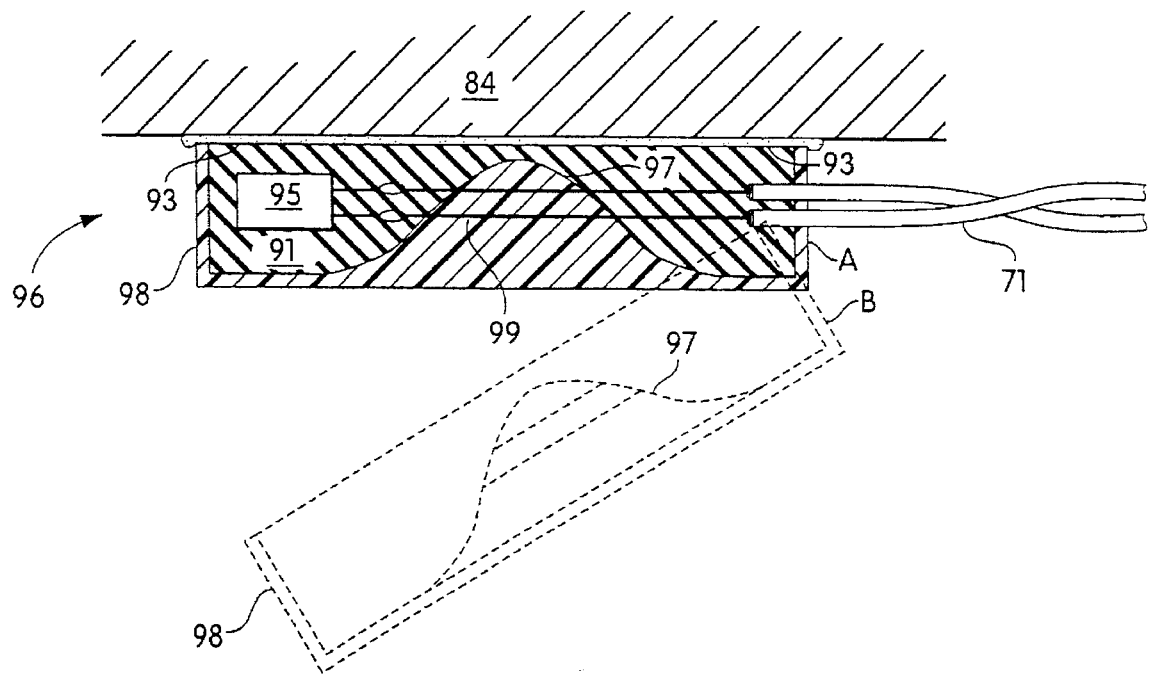
FIG. 5 is a diagrammatic cross-section of a first temperature probe according to the invention installed on a radiator, and showing it in phantom while being removed by tampering.

Referring to FIG. 5, one type of sensor probe 96 includes a trough-shaped hard epoxy shell 98, which is to be mounted with its open side against the surface of the radiator 84. It includes a hard epoxy protrusion 97, which may be generally bell-shaped, that is mounted on the shell's inner surface, opposite its open side. The remainder of the shell is filled with a soft epoxy or rubber-like compound 91, which embeds a sensing element 95, the probe leads 71, and break wires 99. These break wires electrically connect the sensing element and the probe leads. Preferably, at least a portion of these wires are made of a very brittle wire, and this portion is partially embedded in the protrusion. The sensing element can be a Motorola MTS 102 junction-type temperature probe.

The sensor 96 is manufactured by placing the temperature sensing element 95, wire leads 71, and break wires 99 in the shell, and then filling in the protrusion 97 with hard epoxy or plastic. The remaining area of the shell is then filled with the soft epoxy or rubber-like compound 91 flush to the surface of the shell 98. Parting compound, such as silicon spray or a sprayable fat (e.g., "Pam") can be applied between these steps, to prevent the hard epoxy layer from firmly bonding to the soft epoxy layer, thus creating a structural weakness along the parting line.

The probe 96 is installed on the surface of the radiator 84 using an adhesive 93 (position A). Attempts to tamper with the probe by trying to pry or pull it off of the radiator tend to cause the hard epoxy portion to separate from the soft epoxy portion on the parting line between these portions, and thereby break the break wire 99 (position B). The adhesive should exhibit high strength and thermal conduction, and Thermally Conductive Epoxy Adhesive 383, available from the Loctite Corporation of Newington, Conn. is a suitable choice.

Figure 11:
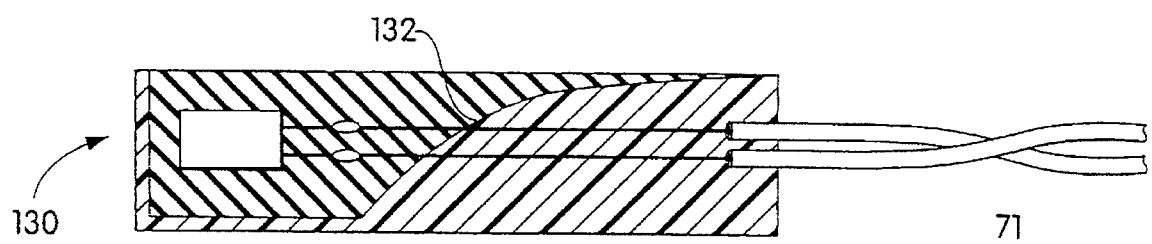
FIG. 11 is a diagrammatic cross-section of a variation on the probe of FIG. 6.
Figure 12:
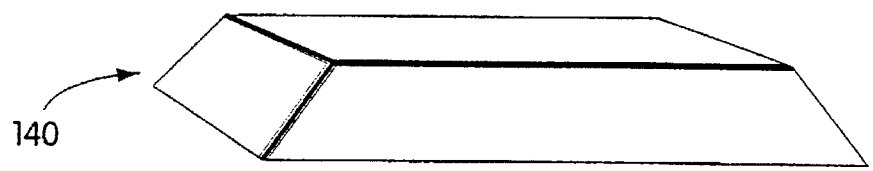
FIG. 12 is a perspective view of a variation on the shell for the probe of FIG. 6.
Figure 7:
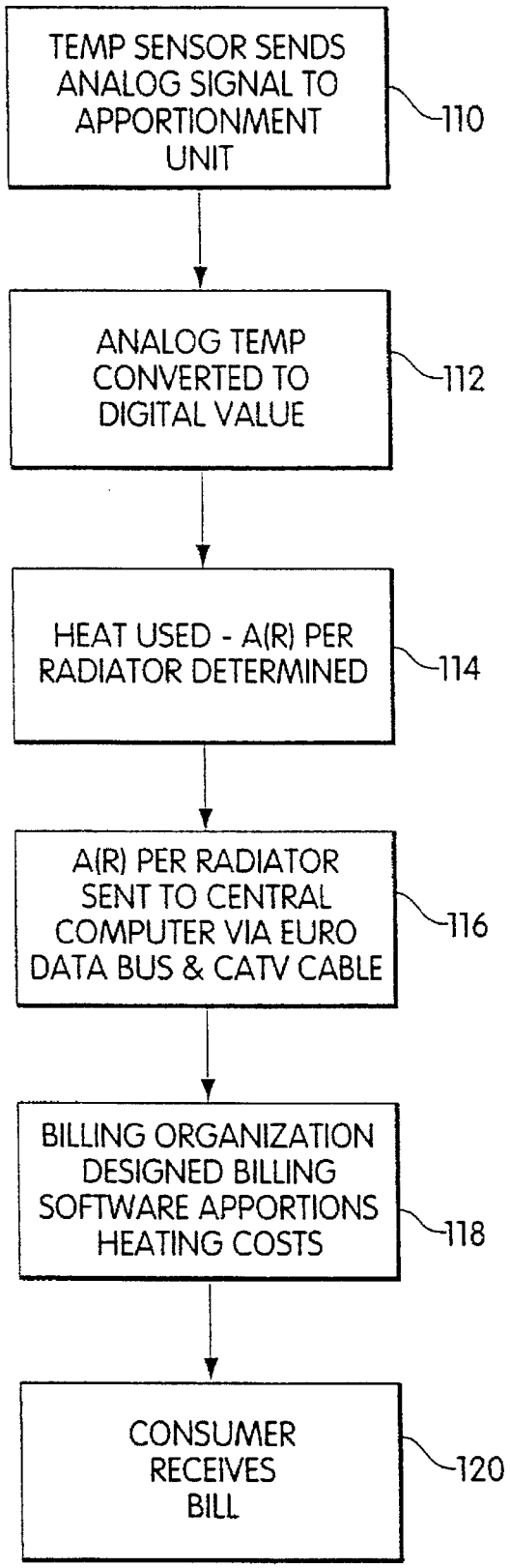
FIG. 7 is a flow diagram illustrating overall operation of an embodiment of the system of the invention installed in the building of FIG. 1, and which includes the apportionment unit of FIG. 2.

Referring to FIGS. 11 and 12, several variations of this type of probe can be manufactured. For example, it can be constructed in an end-filled configuration 130. In this configuration, a protrusion 132 embeds the probe leads 71 and a portion of the break wires. A tapered shell 140 can also be provided on the probe, which makes the probe more difficult to grasp with pliers.

Figure 6:
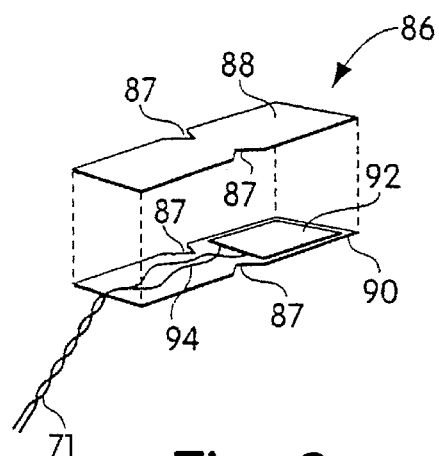
FIG. 6 is an exploded view of an alternative temperature probe according to the invention.

Referring to FIG. 6, an alternative sensor probe which may be placed on a radiator includes a top sheet 88, and a bottom sheet 90, which can each be made of plastic. The top and bottom sheets each include a pair of notches 87, and a temperature sensing element 92 is placed between the sheets. A length 94 of the probe's lead wires 71 is also located between the sheets, which provides some strain relief for these wires. The sensing element can be a Motorola MTS 102 junction-type temperature probe.

The top 88 and bottom 90 sheets are fastened together, by an adhesive or by welding. This construction can be relatively fragile, and the notches 87 introduce an additional significant structural weakness to the structure. Preferably, a portion of the lead wires which passes between the notches is made of a very small gauge wire, such as fuse wire. As a result, the wires break easily when external forces are applied to the probe assembly 86.

Figure 8:
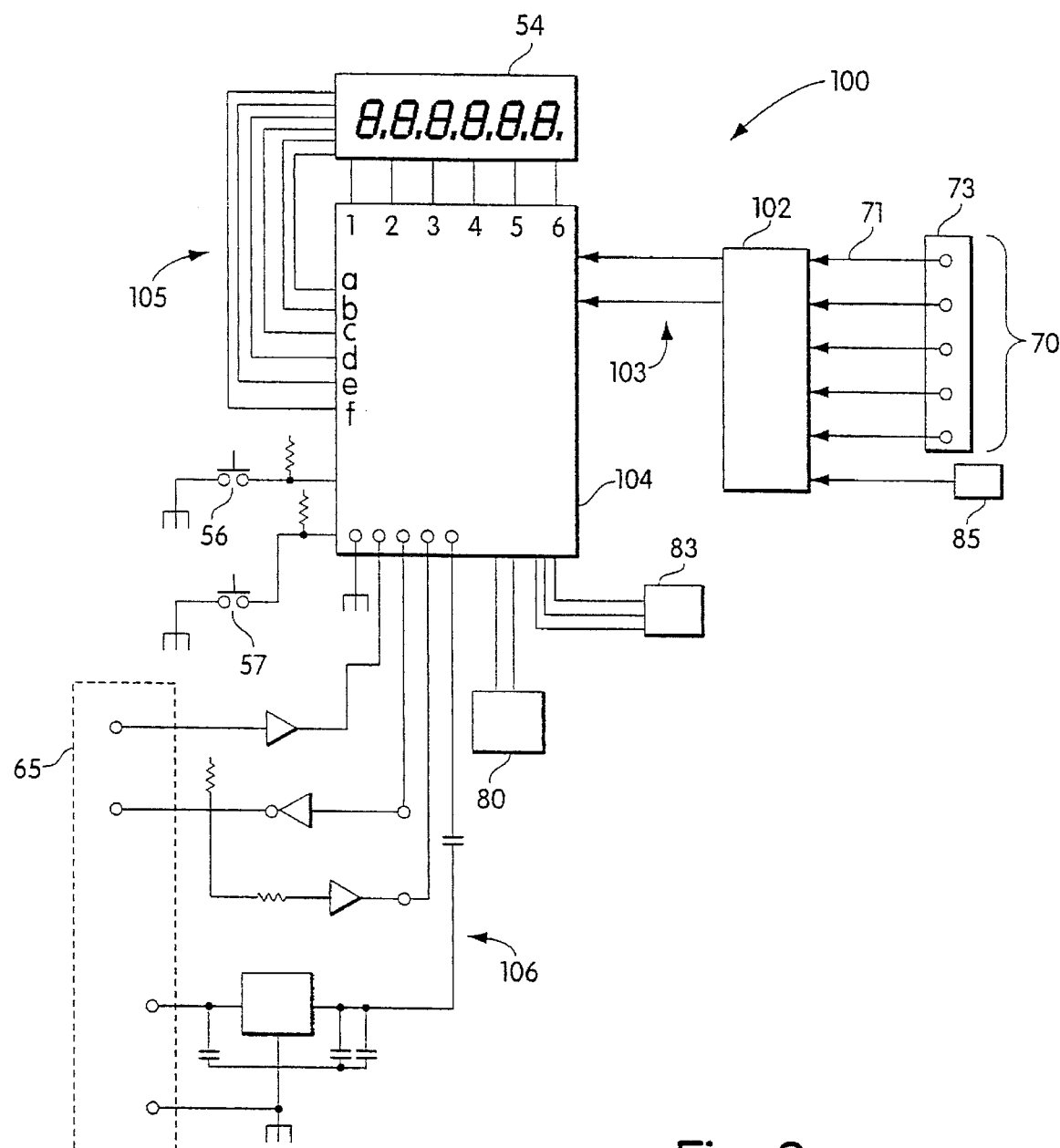
FIG. 8 is a schematic block diagram of the circuitry in the apportionment unit of FIG. 2.

Referring to FIGS. 3 and 8, the wall unit 50 houses apportionment unit circuitry 100, which is preferably mounted on the circuit board 77. This circuitry includes an 8-bit analog-to-digital converter 102, which is responsive to the radiator probe lines 70 and provides its output 103 to a microprocessor 104. The microprocessor has display output lines 105 for driving the display 54, as well as input and output lines connected to local bus interface circuitry 106. Further input lines are responsive to the step button 56, an internal programming button 57 ("Prog"), and the tamper sensor 80.

The interface circuitry 106 is connected to a local bus connector block 65, and up to five remote radiator temperature probes can be connected to a probe connector block 73. An internal temperature sensing element 85 mounted in the unit reports the ambient room temperature to the microprocessor via the analog-to-digital converter. This sensing element can be a Motorola MTS 102 junction-type temperature probe.

Figure 9:
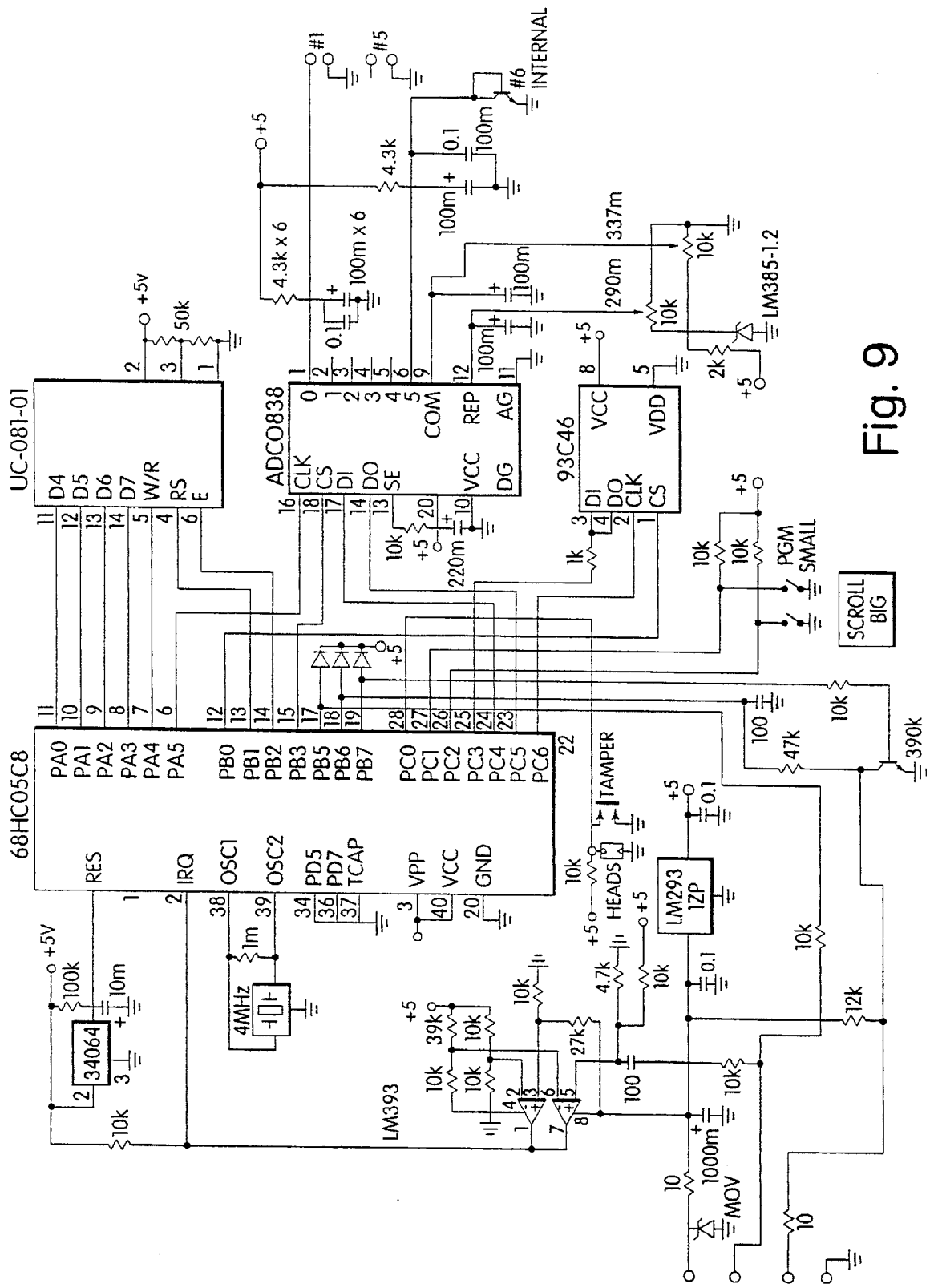
FIG. 9 is a detailed schematic circuit diagram of the circuitry in the apportionment unit of FIG. 2.

Standby power is supplied on the local bus from a storage battery located within the central control unit. In addition, a non-volatile memory 83 (e.g., a 1024 bit EEPROM) in the apportionment unit holds information such as temperature measurements and calculated heat usages during power failures or bus power failures. This non-volatile memory can be integral to the microprocessor. FIG. 9 shows a more detailed schematic illustrating an implementation of the apportionment unit circuitry 100.

Power is supplied to the circuitry 100 at 8 to 12 VDC, 20 ma. maximum. The interface circuitry 106 forms a "Home-Bus" four wire interface including: common, power (nominally 10 VDC), clock, and data lines. Metal oxide varistors (MOV's) for lightning/surge protection are provided on the radiator loops and the interface circuitry. An $I^2L$ type clock and bidirectional databus is used for the interface to the CDT-MDU, and the baud rate of the local bus is 4800 bps.

The Microprocessor 104 is a Motorola 68HC705C8 microprocessor, and the external A/D converter 102 is a National ADC 8838 converter, configured to have a sensitivity of 10.0 mV/degree C. The microprocessor performs heat usage calculations, data storage, data download/upload, and display driving. The display 54 is a 1×6 LCD display, which is alphanumeric capable. The homeowner human interface includes one membrane button 56. The programming button includes one internal snap detect button 57 on the printed circuit board 77.

The apportionment unit 50 is a wall mount unit with three screw holes 64 in its housing. The local bus connector block 65 for the bus interface includes four screw terminals, 5 mm spaced, for #18 to #24 wire. The probe connector block 73 includes five external radiator temperature probe inputs, with two screw terminals each, 5 mm spaced for #18 to #24 wire.

The cover fastening includes two side mount screws, 4.7 mm×6.4 mm, posi-drive, to be installed after the unit is installed, wired, and programmed. One tamper seal is provided on each side, and these are to be affixed after the unit is installed, wired, programmed, and tested. The seals are installed to cover the screw heads and the case separation seam.

Figure 10:
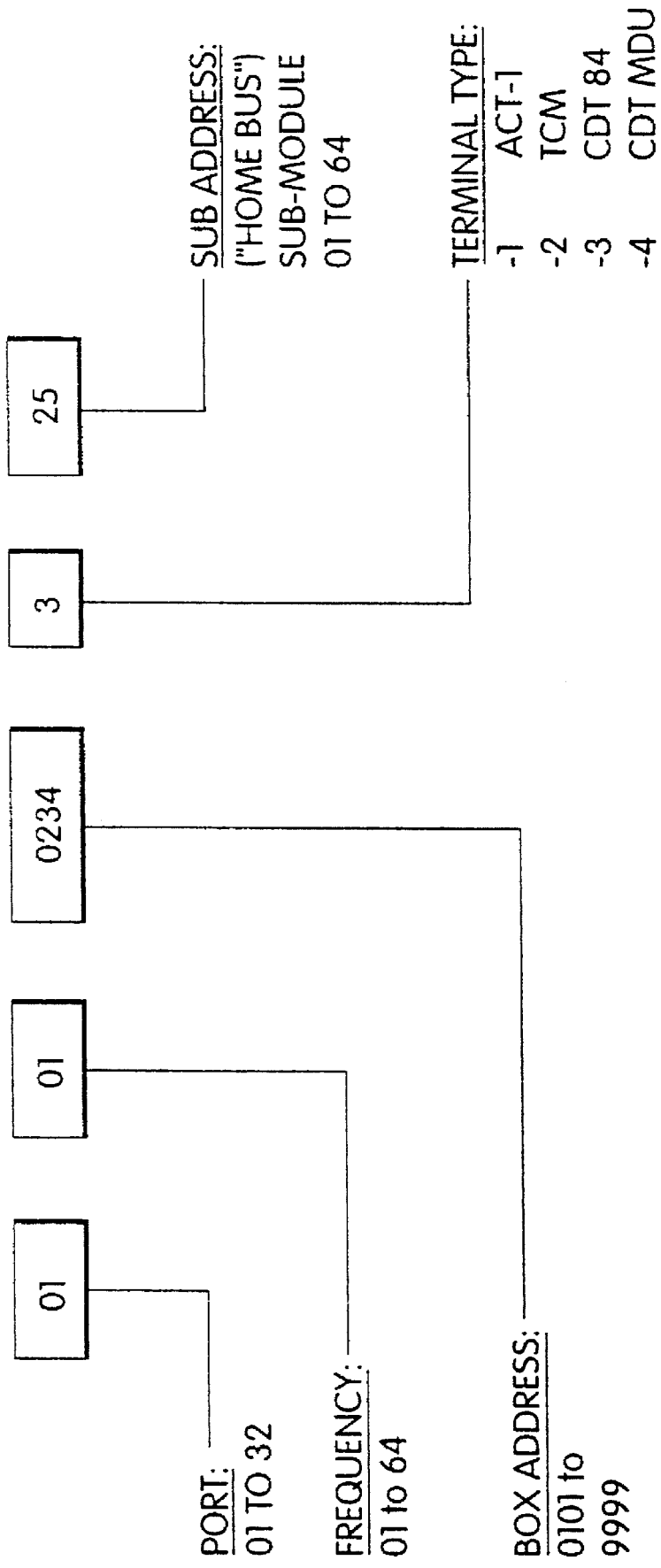
FIG. 10 is an addressing format diagram for the embodiment of the heat apportionment system of the invention described in connection with FIG. 7.
Figure 16:
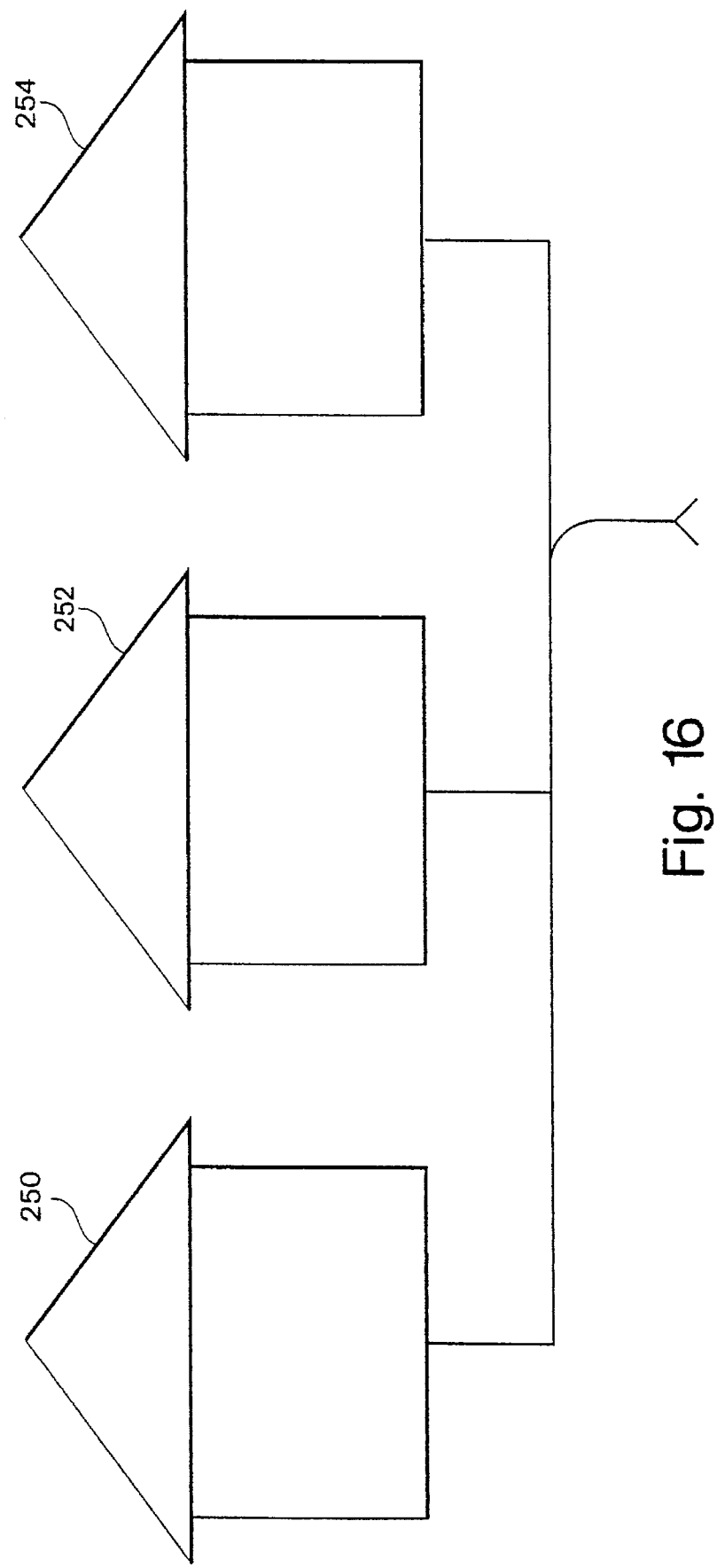
FIG. 16 is a diagrammatic illustration presenting the application of embodiments according to the invention to more than building.

FIG. 10 presents an addressing format for a system according to the invention. It is noted that box addresses 0001 to 0099 are reserved for system status monitor addresses. A customer account number may be mapped to the box address for smaller systems, and larger systems may assign an additional arbitrary six digit customer number unrelated to the box address. Of course, other address formats may be used depending on various system parameters, such as the type of communication method chosen, typical sizes of buildings to be monitored, number of buildings to be monitored (see 250, 252, 254 of FIG. 16), and the like.

Referring to FIG. 4, installation of the system of the embodiment will now be described. A location in the center of the radiator 84, or on its center tube is first selected. The exact position should be ¼ of the way from the top of the radiator as mentioned above. Ideally, the back of the radiator should be used, since the probe will suffer less accidental damage or tamper there.

The probe is then attached to the radiator using the adhesive as illustrated by the following procedure:

Step 1—Sand the area of application on the radiator 84 to bare metal (twice the surface area of the probe metal backing).

Step 2—Sand the backing of the probe 82 until level and smooth.

Step 3—Clean both sanded areas (radiator and probe) with isopropyl alcohol.

Step 4—Apply a very thin coating of the adhesive from its syringe to the radiator only, with no more than a 0.5 mm thickness. Apply enough adhesive to cover the entire surface area of the probe backing, so that it extends beyond the edges of the probe backing when the probe is mounted.

Step 5—Apply the output activator from the clear bottle to the probe backing only, ensuring complete coverage.

Step 6—Mount the probe on the radiator with very firm pressure, by hand. Continue to apply pressure for two minutes until the adhesive has set. "Paint" the adhesive where it extends beyond the edges of the probe with the output activator.

Step 7—Return to the radiator in 24 hours to verify the adhesive bonding and to make sure that no tampering has occurred.

The wire pigtails 71 are then spliced into two conductor cables running to the apartment's apportionment unit. Splicing may be done using a "Scotchlock" system, available from the 3M company of St. Paul, Minn. Using this system, the wire leads need not be stripped, but are simply inserted into a splice block and crimped using a special tool.

The apportionment unit should be installed in a common area of the residential unit away from direct sunlight, doors, or other locations subject to external temperature variations. Preferable locations in residential applications might include inside walls of the living or dining room, or hallways between living and sleeping rooms. The apportionment unit should be firmly mounted to the wall at chest height for easy viewing by the homeowner. For masonry construction, moly plugs should be used to provide a secure mounting to the surface.

Local bus wiring and the individual wiring to the radiators can be installed in a variety of ways. Preferred is to route the wires through the wall. In masonry constructed units, however, the wiring may have to be run along the walls, baseboard, or under floors to obtain access. Various moldings and conduits are also available to allow the wiring to be performed in a professional manner.

Marking can be provided within the unit to indicate how the wiring should be connected to the screw terminals, such as by labeling the terminals "A" through "E". The temperature probes should then be connected in order to loops A through E, and if less than 5 probes are used, they should be connected to the lowest loop letters. The polarity of the temperature probe wiring is to be observed. Typically, a red conductor is connected to a "+" terminal on the apportionment unit, and a black to a "−" terminal on the apportionment unit.

Once the system is installed, the apportionment unit can be programmed to operate in concert with the central controller and the central office. This local programming operation will be discussed in more detail below.

Referring to FIGS. 1–4, 7 and 8, in overall operation of the invention, each probe 82 provides an analog signal via a wire 71 to the apportionment unit 50 (step 110). This analog temperature value is converted by the analog-to-digital converter 102 to a digital value, which is provided to the microprocessor 104 (step 112). The microprocessor determines the heat used per radiator from this value and the ambient temperature (step 114—this operation will be described in more detail below). In response to a periodic query, the apportionment unit sends the value of heat used per radiator to the central control unit 42 via the local bus 34. The control unit then relays it via the CATV cable 36, 44 (step 116) to the remote central computer along with values from other units. The billing organization uses these data for billing determinations according to the methods described below by using billing software, which can be designed to fit in with its existing billing procedures (step 118). The billing organizations then sends a bill to the customer (step 120).

In general, the system of the embodiment operates by measuring the direct surface temperature of a radiator, which may be fluid filled, and developing an approximate usage from the radiator temperature, radiator size, radiator efficiency, room temperature, and other variables. The system need not provide a calibrated value of energy used for heating, but rather provides an apportioned or percentage usage of central heat by the individual dwellings. The actual heat bill is then derived by dividing the total building heat costs among the dwellings based upon the proportion measurement provided by the apportionment units.

The probes actually make thermal contact with a polished section of the metal radiators to minimize any effects of rust, corrosion, or the like. Measuring the temperature at the radiator surface (rather than the temperature of the heated water or steam) nullifies the effects of temperature differences between radiators because of inadvertent differences in water flow rates that may exist as well as effects caused by the relative positions of radiators connected in a string or loop. Each probe is attached at the appropriate location on its radiator in order to average any temperature gradients that exist across the radiator, as presented above in connection with FIG. 4. This approach allows the radiator to be thought of as a variable source of heat analogous to a battery used as a source of voltage in an electrical circuit.

More than one type of radiator may be used in a city. Each type may be manufactured in a variety of sizes to be installed in different size rooms in the same building, with all of them connected to the same central heating system. The heat transfer factor $K_Q$ for each of these radiator sizes, and the values of $K_C$, $K_T$, and $K_A$ (defined below) can be evaluated based on the actual construction of the radiators and the probe and mounting selected.

The temperature at each radiator in the apartment is sampled by the apportionment unit every one minute. In the microprocessor installed in the apportionment unit and/or the central computer, these sample values are processed using the heat equation discussed below, then summed together to provide an instantaneous heat input value to that residential unit. When integrated over a given period of time, the value obtained is proportional to the heat input over that time period. This is similar to the concept of "degree days" used in some countries to predict the use of fuel by heating customers.

It is assumed that each residential unit consists of m rooms, each with one or more radiators. Seven or more radiator types may be used, and each type may come in several sizes. These radiators all operate identically, e.g., hot water under pressure, steam, or another fluid is forced through them to heat up the metal coils or plates. These coils or plates, in turn, give up heat to the surrounding air by radiation and convection. The amount of heat each provides is in direct proportion to the surface area of each type and size of radiator. Any gradient over the radiator structure is taken into account by placing the temperature probe at the point on the radiator at which the means temperature exists, as discussed above in connection with FIG. 4.

The basic equation describing the heat supplied by a radiating body is given as:

$$Q = Q_N (\Delta T/\Delta T_N)^n \qquad \text{(Equation 1)}$$

where:

$Q$=heat emission.

$Q_N$=heat emission under standard conditions (Normleistung DIN 4704, T1).

$\Delta T$=the temperature rise of the radiating body from its quiescent temperature (taken to be 20° C.).

$\Delta T_N$=60° C., a reference temperature difference, $T_v$=90° C., $T_R$=70° C., $T_L$=20° C.).

n=a small exponent (approximately 1.3) which expresses the observed non-linearity.

This standard heat equation approximately defines any heat system response to changes in the input, i.e., electricity, water flow or temperature, steam flow, or even the heat output of fossil fuels directly. The equation simply states that the output of the heat system is proportional to the input, factored by the small exponent n. The n exponent expresses the observation that as the temperature gets higher, it becomes harder to raise the radiator output relative to ambient temperature.

Over a period of time, the heat provided by the radiator is proportional to both the temperature to which it is raised above a base temperature and to its surface area. Thus, for example, if the radiator valve is turned off (no heat supplied by the boiler), and the radiator is in a steady state condition with respect to its surroundings, there is no transfer of heat to the room. The steady state temperature of the radiator is the temperature it assumes when no heat has been applied for a long time. Typically, in a well insulated building, this is approximately 20° C.

The heat provided to the room by a radiator over a period of time, t, is:

$$A_R = K_Q K_C K_T K_A \cdot B \int_0^t (T_M - T_C)^n dt \qquad T_M > 27° C$$

$$A_R = 0 \qquad T_M \leq 27° C. \qquad \text{(Equation 2)}$$

where:

$T_M$=the time dependent temperature measured by the probe, in °C.

$T_C$=the base steady-state radiator temperature, 20° C.

$K_Q$=a factor for the heat emission of a radiator proportional to the "Normleistung" DIN 4713, Teil (Section) 1;

$K_C = K_Q = \dot{Q}_{NR}/\dot{Q}_{NO}$ (DIN 4713, T3, para. 2.8.1). a factor for the head transfer to the probe (DIN 4713, T3, para. 2.8,2.).

$K_T$=a factor which provides a correction for the room temperature deviation (DIN 4713, T3, para. 2.8.3).

$K_A$=a correction factor for special connections and attachments to the radiator (DIN 4713, T3, para. 2.8.4).

B=factor dependent upon the desired solution in accordance with DIN 4713, T3, para. 4.1.9.

For example, $B=\dot{Q}_{NO}/\Delta T_N{}^n$, for $\dot{Q}_{NO}$=1 KW, $\Delta T_N$=60° K., n=1.3, B=4.88×10$_{-3}$ KW/°K.

$A_R$=the probe readout for a specific radiator.

All K-factors and calculations use a resolution of 0.01, and five digits are available for display of K-factors, temperature, and Heat Summation Value (H). The apportionment unit begins heat summation counting at 27° C., and as a result of control signals from the central controller, it can make a summer/winter (no count/count) decision.

A number of areas of potential error could be theorized. For example, outdoor temperature might be suggested to affect the calculations since the assumed indoor temperature baseline of ΔT of 20° C. could be different by a large amount. In this case, it is important to remember that the unit is not measuring a calibrated heat unit value, but rather is apportioning the heat used by each residential unit. Since all units are similarly affected by the outside temperature, the potential error is in the same direction by a similar amount, and therefore is canceled in the overall apportionment scheme.

A study of the heat equation shows that the error of the probe is magnified by the equation. For older radiators of lower efficiency, the magnification effect is lower, but for new high efficiency radiator designs, the error magnification can approach a factor of 4 to 1. The accuracy of the temperature probes, therefore, is a prime consideration.

Sensing elements may be supplied with slight variations in sensitivity and their manufacturer may provide a correction factor for each sensing element, which allows these variations to be taken into account. Correcting for these variations provides a higher degree of accuracy in the apportionment operation. The correction factors are therefore printed on each temperature probe, and at installation, they are entered into the apportionment unit by the installer.

The n factor in equations 1 and 2 is sub-part of the B factor:

$$B=\dot{Q}_{NO}/\Delta T_N{}^n$$

While n can vary from 1.0 to 1.5, the modern radiator is generally considered to have a n factor of 1.3. Practical heat metering according to the invention assumes that all factors are constant, including the n factor of 1.3, and that the only changeable factor is a K factor. The installer therefore enters a K factor for weighing the signal from each radiator probe connected to the apportionment unit. Further programming in the apportionment unit allows the account or address number to be entered on the master unit, which is used to identify that particular dwelling unit on the local bus and at the central computer center.

When programming is completed, the occupant can view a selective menu of items on the display of the apportionment unit. These items include the heat summation value at that point in time, the monthly summation, and the individual K factors for each radiator, which allow the occupant to verify that they are appropriate. The heat summation value increases over time in proportion to the heat usage of the dwelling unit, developing an accumulated usage reading much like a water meter provides a water usage reading. The summation value for each individual radiator and the room temperature can also be checked by the resident.

A feature of the apportionment unit is the zeroing of the summation reading each month, which allows the unit to provide the occupant with a monthly to-date value of heat usage. This zeroing is initiated by the central computer, which sends a master command to all apportionment units precisely at the end of each month. The accrued heat summation value, however, continues to increase month after month. An additional feature is the ability to remotely turn off the heat summation function, as may be desired in the summer months. The unit would then display the words "Sum Off".

The apportionment unit has four modes: Run, Interrogate Answer, Remote Data Download, Local Programming, and Diagnostic. In Run Mode the unit converts temperature probe output to a digital value, calculates heat usage values (using the heat equations described above), and stores values for heat usage. It also displays current room temperature and provides for stepping through each radiator and total heat usage. In Interrogate Answer Mode, the unit answers interrogation specific to its module address, and then returns its address and heat usage total value. Tamper indicating codes or fire detection codes may also be returned in this mode. In Data Download Mode, the unit accepts downloaded data specific to the unit's address and displays the data. In local Programming Mode, the unit provides for local input of data at the unit's mounted location during its installation. In Diagnostic Mode, the internal recessed detect button activates, and the unit steps through diagnostics of internal operation and of the external interface.

The apportionment unit provides for an orderly shutdown to include storage of final data readings, protection of storage, and preparation for restart/refresh in response to loss of power or tampering. This is accomplished using watchdog and power-down circuitry in the unit. The EEPROM is used to store configuration parameters, table data, measured temperature, and calculated heat usage until normal operating conditions are restored.

The program contained in the apportionment unit microprocessor is protected by locking codes so that they cannot be copied or downloaded by unauthorized persons. Firmware for implementing this type of protection is available from Motorola for the microprocessor used in the present embodiment. The system is also designed not to allow the heat summation value to be reset with the circuitry present, so that the occupant cannot attempt to reset or tamper with the values on the meter.

Referring to FIGS. 2 and 3, after the central control unit and the radiator probes are attached and wired to the appropriate inputs on the apportionment unit 50, as discussed above, the individual radiator K factors, the local bus address, and the temperature probe correction factor as well as other data can be programmed. Upon power up with the cover 50 removed, a tamper message, such as the words "DEFEKT" and "MELDEN" presented alternatively, flashes on the display 54. The message clears once the programming button 57 is pushed, although it continues to be reported to the central monitor as long as the cover is removed. The cover can be held in place to verify the next three steps, but care should be taken to not damage the tamper switch 80.

Power is first applied to the apportionment unit 50, which is evident if the unit is displaying room temperature. The display 54 should read: "T21.5C", or some similar temperature reading. If the apportionment unit is being programmed for the first time, upon pressing the Scroll button 56 the heat summation should display: "000000". Upon pushing the button again, the monthly summation, if it is activated for display, should indicate: "M00000".

The Local Programming Mode is selected by removing the cover 58 of the wall mounted unit, and pushing the printed circuit board mounted programming (Prog) button 57. The unit then flashes the display 54, and K factors can be entered from 0.10 to 15.10. The unit does not accept values outside the range defined by "KAXX.XX".

The first digit is entered by stepping with the Scroll button 56. As each digit is set, the Prog button 57 is pressed to step to the next digit. Mistakes can be corrected by continuing to step through the digits. When the first K factor for the first radiator is correct, pressing the Prog and Scroll buttons for one second will confirm its entry.

The display 54 then displays "KBXX.XX" again, and the installer continues to program the K factors for each radiator loop that is active. If loops are not used, they can be skipped by holding both buttons down for one second. If programming stops for more than 30 seconds between keystrokes, the unit exits the programming mode, and all values entered revert to previously retained values.

After programming the K factors, the unit's terminal sub-address is programmed so that it can report on the local bus. Following the sequence above, the display will show: "EBA XX" or "EBA 64" (for example) if a sub-address has been pre-programmed. The addresses can be stepped through with the Scroll button 56 until the correct address is shown, and then both buttons 56, 57 are held down to program the address. If the address is already correct, this step can be skipped by holding both buttons down for one second.

After programming the sub-address, the temperature probe correction factor can be programmed for each radiator loop. Each loop is shown in sequence: "SA XXX" . . . "SE XXX" and correction factors are accepted between 85 and 115, with 100 being nominal. Each step is a ½° C. correction, and each temperature probe has its correction factor printed on its exterior. If the radiator loop values are correct, the next step is reached by holding both buttons down for one second.

A final prompt is for display options. This determines what the resident can see in the normal operating mode. The following modes are available:

TABLE I

| Mode 1: | Display room temperature (TE) and heat summation (H). |
| Mode 2: | Display TE, H, and monthly (M). |
| Mode 3: | Display Mode 1 plus K for each radiator. |
| Mode 4: | Display Mode 2 plus K for each radiator. |
| Mode 5: | Mode 3 + heat summation (H) for each radiator - the normal mode per DIN4713, T3. |
| Mode 7: | Test diagnostic mode showing all of the above, temperature of each radiator probe, and all programming values. |

The standard setting for display options is Mode 5—displaying room temperature (TE), heat summation (H), and K-factor for each radiator A–E. For troubleshooting and general testing, Mode 7 may be initially selected so that all parameters can be scrolled through on the display. Then Mode 5 can be selected.

The Mode selection prompt on the display 54 is: "DIS X". The mode can be selected by pushing the Scroll button 56. Once the desired mode is displayed, it can be programmed by holding both buttons 56, 57 for one second. This completes the programming of the apportionment unit. Continuing to hold both buttons down enables the installer to see if the heat summation function is activated from the central computer, which will be confirmed by the unit displaying the words "Sum On". The unit then returns the installer to the tamper alarm display.

Once the unit is programmed, the front cover 58 can be installed, taking care to position the tamper switch 74 correctly, which will be confirmed when the DEFECT/ MELDEN message is cleared. Adhesive tamper seals should then be installed to cover the two screws securing the cover and to extend over the cover seam.

The unit normally displays the values allowed by the display mode selected. The homeowner can scroll through the allowed displays using the single scroll button located on the cover of the unit. For homeowner access, the displays include the following:

TABLE II

| T20.6C | Ambient room temperature |
| 000000 | Heat summation total to date |
| KA0000 | K-factor for each radiator |
| . | |
| . | |
| . | |
| AXXXXX | Heat summation for each individual radiator A–E |
| A AUS | Shows radiator inputs not used on apportionment unit |
| M00000 | Heat summation this month |
| KA15.10 | K factor for each radiator A–E |
| DEFEKT MELDEN | Tampering alarm (contact service company) |
| XXXXXX | No value available |

Various other message displays may be sent to the resident on the LCD, which are preferably self-explanatory.

For service company access (mode 7), the display shows all displays above plus:

TABLE III

| A 75C | Individual radiator temperatures |
| . | |
| . | |
| . | |
| EBA 64 | Local bus module sub-address |
| SA XXX | Temperature probe correction factor, probe A–E |
| DIS 5 | Resident display mode 1–7 probe A–E |
| SUM ON | Heat summation activated from central computer |

The system of the embodiment utilizes three categories of tamper protection: physical barriers, electrical sensing circuits, and software out-of-limit detection procedures. The combination of these three types of tamper protection provides a high degree of confidence both to the billing organization and to the user that the apportionment of heat usage is fair.

Physical barriers include the ABS plastic high-impact housing 50 with all vents, slots, holes, etc. providing protection from physical entry. The face of housing is designed not to allow entry of fluids or dust. One-time-usable, serial-numbered adhesive tamper seals cover the posi-drive screws and housing seam, which secure the housing together, to preclude undetected entry. New seals are to be used whenever the housing has been opened. The screws securing the unit to the wall are not accessible with the cover in place, and radiator probes are secured with epoxy adhesive and break if attempts are made to forcibly remove them.

Electrical fault sensing includes monitoring the tamper switch, which causes the unit to report a tamper condition to the central computer and on the display if the cover 50 is removed. Forcible removal of radiator probes causes an open or shorted sensor loop, and the apportionment unit reports this as a tamper condition on the display and as a fault to the central computer. An open or short in the rest of the sensor loop is also reported as a tamper on the display and as a fault to the central computer. Shorts or opens on the local bus as well as power failures are similarly reported as failures to the central computer, but the display goes blank, and the unit continues to store data readings to the EEPROM under backup battery power instead of sending them over the local bus.

Software reports out-of-range temperatures and temperature differences as suspected tampering or as a fault condition. This type of detection includes comparing room ambient temperature to radiator temperature differences against standards to detect abnormally low conditions (e.g., fan on radiator) and reporting these as suspected tampering. The system also profiles radiator temperature to ambient lag and rate of change to detect suspected probe tampering by removal. Both of these are sensed as tamper alarms by computing the rate of change downward. Heat usage patterns can also be checked against outside temperatures to detect tampering. These types of tamper detection can be performed locally or by the central computer system. A local alarm history is stored in the HAS unit should power and/or communications to the central computer be cut off.

The central computer system also reports and tracks reprogramming numbers to detect unauthorized reprogramming of the apportionment unit. Data sent from the apportionment unit to the central computer are scrambled to prevent unauthorized tampering or reading of the data stream.

The apportionment system of the invention can also include a fire detection feature. This feature can be implemented within the apportionment unit's microprocessor operating software, and reports rapid temperature increases, abnormally high temperatures, or a combination of both as a potential fire to the central computer. Thse can be detected at either the radiator probes or the ambient room temperature sensor.

This fire detection feature can also be installed in a thermostat for the apartment, independent of the apportionment features of the invention. An inexpensive piezo buzzer can be provided in the apportionment unit or thermostat to warn residents as well. Alternatively, an autodialer connected to a telephone line can be activated.

This feature is not intended as a replacement for a smoke detector, but provides an added measure of safety. It has the advantage of being centrally powered, so some protection is afforded users who forget to install batteries in their smoke detectors. Given an apportionment system as described above, this feature can provided by simply adding monitoring software, making it relatively inexpensive.

Figure 13:
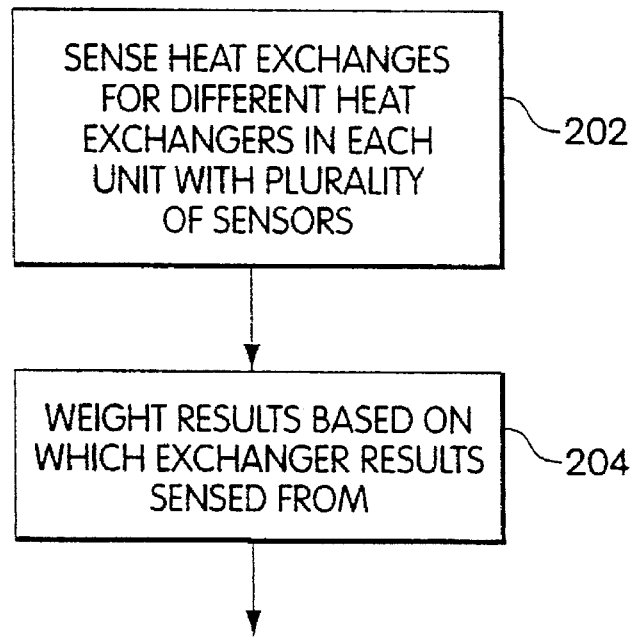
FIG. 13 is a flow diagram illustrating operation of embodiments according to the invention.

As shown in FIG. 13, embodiments according to the invention can sense heat exchanges for each of a plurality of different heat exchangers in each unit with a plurality of sensors (step 202), and weight results of the step of sensing based on which of the heat exchangers the results were sensed from (step 204). Note that sensors (e.g., such as those shown in FIGS. 5 and 11) are interchangeable, and that the system can sense every heat exchanger in each unit (e.g., 210, 212, and 214 of FIG. 1).

Figure 14:
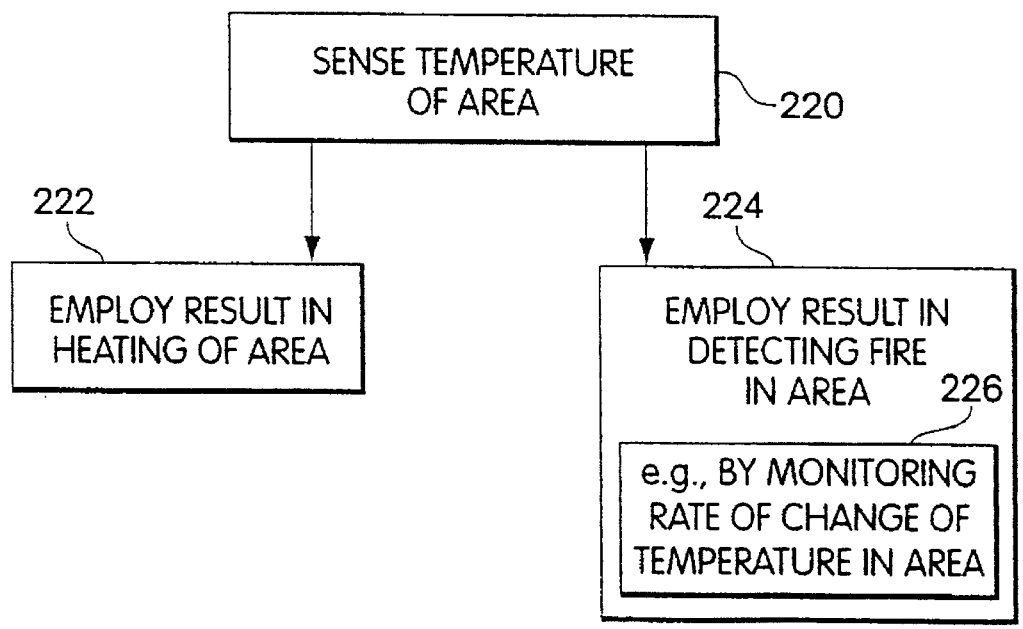
FIG. 14 is another flow diagram illustrating operation of embodiments according to the invention.

As shown in FIG. 14, embodiments according to the invention can sense a temperature of the area (step 220), employ a result of the step of sensing in the heating of the area (step 222), and employ the result of the step of sensing to detect fire in the area (step 224). The step of employing the result of the step of sensing in detecting fire can include monitoring the rate of change of the temperature measured in the step of sensing (step 226). Power for the step of sensing can be provided from a location remote from the area to be monitored (228 of FIG. 3).

Figure 15:
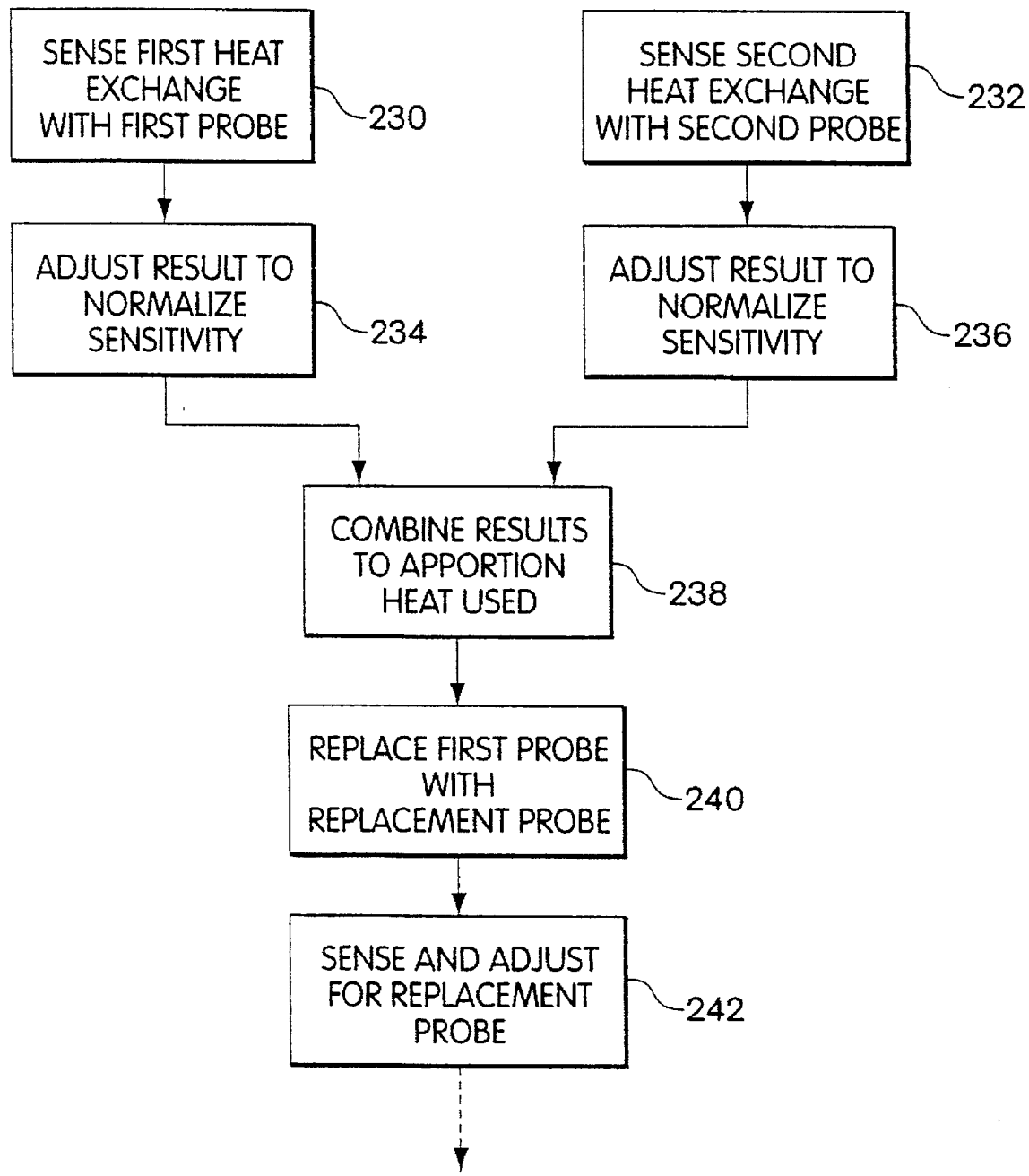
FIG. 15 is a further flow diagram illustrating operation of embodiments according to the invention.

As shown in FIG. 15, embodiments of the invention can sense a first heat exchange using a first probe (step 230), sense a second heat exchange using a second probe (step 232), adjust a result of the step of sensing a first heat exchange to normalize a sensitivity of the first probe (step 234), adjust a result of the step of sensing a second heat exchange to normalize a sensitivity of the second probe (step 236), and combine results of both of the steps of adjusting to apportion heat used in the heat exchanges (step 238). The first probe can be replaced with a replacement probe (step 240), the first exchange can then be sensed with the replacement probe, and a result of the step of sensing with the replacement probe can be adjusted to normalize a sensitivity of the replacement probe (step 242).

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for apportioning energy costs among a plurality of units, comprising:

sensing a heat exchange for at least one heat exchanger in each unit;

determining, in response to the heat exchange sensed in the step of sensing, a respective value corresponding to an amount of heat provided by the heat exchanger in each unit;

transmitting each respective value from the unit to a central location in the absence of a fault condition;

upon detection of the fault condition, ceasing the step of transmitting and initiating a step of locally storing each respective value at the unit, processing, at the central location, each respective value to apportion energy cost for each unit as a function of the respective value and an energy cost for the plurality of units.

2. The method of claim 1, wherein the step of processing apportions energy costs for units in more than one building.

3. The method of claim 1 wherein the step of detecting a fault condition includes detecting a power or a communications failure.

4. The method of claim 1, wherein the step of transmitting each respective value to a central location includes transmitting a value over a local bus.

5. The method of claim 1, wherein the step of transmitting each respective value to a central location includes transmitting the value over a bidirectional cable television link.

6. The method of claim 1, further including the step of generating an indication of fire in the unit based on each respective value.

7. The method of claim 1, wherein the step of sensing includes sensing heat exchanges for each of a plurality of different heat exchangers in each unit with a plurality of sensors, and further including the step of weighting results of the step of sensing based on which of the heat exchangers the results were sensed from in the step of sensing.

8. The method of claim 7, wherein the step of sensing employs interchangeable sensors for sensing the temperature of different types of heat exchangers.

9. The method of claim 1, wherein the step of sensing employs sensing elements having differing calibration factors, and further including the step of compensating for the differing calibration factors.

10. The method of claim 9, further including the step of providing a printed compensation factor on the sensing elements.

11. The method of claim 1, further including detecting tampering with one of the steps of sensing and determining.

12. The method of claim 11, wherein the step of detecting tampering includes transmitting an indication that the tampering has occurred to the central location.

13. The method of claim 11, wherein the step of detecting tampering includes presenting an indication to the user that the tampering has been detected.

14. The method of claim 11, wherein the step of detecting tampering detects tampering with the step of sensing.

15. The method of claim 11 wherein the step of detecting tampering detects out-of-range values.

16. The method of claim 1, further comprising the steps of:
   sampling the sensed heat exchange at intervals;
   calculating the value corresponding to an amount of heat provided for each sampled heat exchange; and
   integrating, over time, each sampled value to provide a total value corresponding to a total amount of heat provided by the heat exchanger over time.

17. The method of claim 16, wherein the step of sensing senses a respective heat exchange of a plurality of heat exchangers in a unit; and further comprising the steps of:
   respectively sampling the sensed heat exchanges at intervals;
   respectively calculating the value corresponding to an amount of heat provided for each sampled heat exchange;
   respectively integrating each sampled value to provide a respective total value for each heat exchanger in a unit; and
   summing the respective total values to provide a heat summation value corresponding to a total amount of heat provided to the unit over time.

18. The method of claim 17, wherein the step of processing includes apportioning energy costs as a function of the heat summation value for each unit.

19. The method of claim 18, wherein the step of processing includes apportioning energy costs in direct proportion to the heat summation value for each unit.

20. An apparatus for apportioning energy costs among a plurality of units, comprising:
   a first probe responsive to a first heat exchange at a first heat exchanger in each unit;
   an apportionment module in each unit and responsive to the probe in that unit, the apportionment module being operable to transmit a first value corresponding to an amount of heat provided by the first heat exchanger in each unit;
   a communications channel responsive to the apportionment module, wherein the communication channel includes a bidirectional cable television link; and
   a central billing computer responsive to the apportionment module via the communications channel, and operative to apportion energy costs for each unit as a function of the first transmitted value and an energy cost for the plurality of units.

21. The apparatus of claim 20, wherein the probes are temperature probes.

22. The apparatus of claim 20, further including at least a second probe responsive to a second heat exchange at a second heat exchanger in each unit, and wherein the apportionment module is further responsive to the second probe in that unit, the apportionment module being operable to transmit a second value corresponding to an amount of heat provided by the second heat exchanger in each unit, and wherein the central computer is further operative to apportion energy costs for each unit as a function of the second value.

23. The apparatus of claim 20, wherein the communication channel includes a local bus link.

24. The apparatus of claim 20, wherein the plurality of units includes a plurality of units in each of a plurality of buildings and wherein the communication channel includes a bidirectional cable television link between each of the buildings and the central computer.

25. The apparatus of claim 20, wherein the probe comprises a solid state temperature probe.

26. The apparatus of claim 20, wherein the probes are each marked with a calibration value.

27. The apparatus of claim 20, wherein the apportionment module includes a display and a user control.

28. The apparatus of claim 27, wherein the user control consists of a single switch.

29. The apparatus of claim 27, further including a programming control located inside the apportionment module.

30. The apparatus of claim 20, further including tamper detection circuitry and wherein the apportionment module is responsive to tampering with the apparatus to transmit a tampering indication over the communication channel.

31. The apparatus of claim 30, wherein the tamper detecting circuitry is a switch in the apportionment module, which switch is responsive to opening of the unit.

32. The apparatus of claim 31 wherein the switch comprises a metallic contact mounted on foam.

33. A system for apportioning energy costs among a plurality of units, comprising:
   means for sensing a temperature of at least one heat exchanger in each unit;
   means, responsive to the means for sensing, for determining a respective value corresponding to an amount of heat provided by the heat exchanger in each unit;
   means for transmitting each respective value from the unit to a central location;
   local storage in the unit,
   means for, upon detection of a fault condition, deactivating the means for transmitting and storing each respective value in the local storage, and
   means, located at the central location, for processing each respective value to apportion energy costs for each unit as a function of the respective value and an energy cost for the plurality of units.

34. The apparatus of claim 33, wherein the means for determining comprises an analog-to-digital converter responsive to the means for sensing, a microprocessor responsive to the analog-to-digital converter, and wherein the means for transmitting includes a local bus interface responsive to the microprocessor and to a communications channel.

35. The apparatus of claim 34 further including non-volatile storage responsive to the microprocessor.

36. The system of claim 33, wherein the means for determining further comprises:
   means for sampling the temperature sensed by the means for sensing at intervals;
   means for calculating the value corresponding to an amount of heat provided for each sampled temperature; and
   means for integrating, over time, each sampled value to provide a total value corresponding to a total amount of heat provided by the heat exchanger over time.

37. The system of claim 36, further including means responsive to the means for sensing to warn residents of the unit of a fire.

38. The system of claim 36, further comprising:
- a further plurality of means for sensing a respective temperature of a further plurality of heat exchangers in a unit and wherein:
- the means for sampling is for respectively sampling the temperature sensed by each means for sensing at intervals;
- the means for calculating is for respectively calculating the value corresponding to an amount of heat provided for each sampled temperature;
- the means for integrating is for respectively integrating each sampled value to provide a respective total value for each heat exchanger in the unit; and further including:
- means for summing the respective total values to provide a heat summation value corresponding to a total amount of heat provided to the unit over time.

39. The system of claim 38, wherein the means for transmitting includes a local bus link.

40. The system of claim 38, wherein the means for transmitting includes a bidirectional cable television link.

41. The system of claim 38, wherein the means for processing is for apportioning energy costs as a function of the heat summation value for each unit.

42. The system of claim 38, wherein the means for sensing comprise solid state temperature probes.

43. The system of claim 38, wherein the means for determining includes display means and user control means.

44. The system of claim 43, wherein the user control means consists of a single switch.

45. The system of claim 44, wherein the control means further includes programming control means.

46. A probe, comprising:
- a probe body,
- an electrical heat sensing element mounted in the probe body,
- a conductive lead operatively connected to the probe,
- a tamper detecting mechanism responsive to forces applied to the probe and operative to interact with the lead to provide an electrical tampering indication, and
- a pair of probe portions each embedding a portion of the lead, wherein a structural weakness is located at an interface between the portions.

47. The probe of claim 46, further comprising means for attaching the probe body to a heat source.

48. The probe of claim 47, wherein the means for attaching comprises an adhesive.

49. The probe of claim 46, wherein each of the probe portions is made of a different material, and wherein the material used in one of the probe portions is harder than the material used in another of the probe portions.

50. The probe of claim 49, wherein one of the portions forms a protrusion in which a part of the lead is embedded.

51. A probe, comprising:
- a probe body,
- means for attaching the probe body to the heat exchanger, wherein the probe body is tapered away from the means for attaching,
- temperature sensing means mounted in the probe body for sensing a temperature of a heat exchanger,
- conductive lead means operatively connected to the sensing means, and
- tamper detecting means for detecting tampering with the probe and for providing a tampering indication via the lead means.

52. The probe of claim 51, wherein the probe further includes a pair of probe portions each embedding a portion of the lead means, and wherein a structural weakness is located at an interface between the portions.

53. A method of monitoring an area, including:
- sensing a temperature of the area,
- employing in a module at the area a result of the step of sensing in the heating of the area,
- employing the result of the step of sensing to detect fire in the area, and
- warning residents of the area of the fire by a warning device in the module upon detection of the fire.

54. The method of claim 53, wherein the step of employing the result of the step of sensing in the heating of the area includes apportioning heat.

55. The method of claim 53, wherein the step of employing the result of the step of sensing in the heating of the area includes regulating the temperature of the unit.

56. The method of claim 53, wherein the step of employing the result of the step of sensing in detecting fire includes monitoring the rate of change of the temperature measured in the step of sensing.

57. The method of claim 53, further including the step of providing power for the step of sensing from a location remote from the area to be monitored.

58. A method of monitoring heat exchanges, including:
- associating a first coefficient with a first probe,
- associating a second coefficient with a second probe, the first and second coefficients being different,
- after the step of associating a first coefficient, installing the first probe on a first heat exchanger and electrically coupling the first probe to a heat apportionment circuit,
- after the step of associating a second coefficient, installing the second probe on a second heat exchanger and electrically coupling the second probe to the heat apportionment circuit,
- storing in the heat apportionment circuit the first and second coefficients,
- sensing a first heat exchange at the first heat exchanger using the first probe,
- sensing a second heat exchange at the second heat exchanger using the second probe,
- adjusting according to the first coefficient a result of the step of sensing a first heat exchange to adjust a sensitivity of the first probe,
- adjusting according to the second coefficient a result of the step of sensing a second heat exchange to adjust a sensitivity of the second probe, and
- combining results of both of the steps of adjusting to apportion heat used in the heat exchanges as a function of an energy cost for a plurality of units.

59. The method of claim 58, wherein the step of sensing senses every heat exchanger in each unit.

60. The method of claim 58 further including the steps of associating a replacement coefficient with a replacement probe, after the step of associating a replacement coefficient replacing the first probe with the replacement probe, sensing the first heat exchange with the replacement probe, and adjusting a result of the step of sensing with the replacement probe to adjust a sensitivity of the replacement probe.

61. The method of claim 58 further including the steps of printing a first calibration value on the first probe and printing a second calibration value on the second probe, and wherein the first and second calibration values are respectively used to define the first and second coefficients used in the steps of adjusting.

62. The method of claim 58 wherein the step of combining sums results of both of the steps of adjusting to determine an aggregate amount of heat supplied to an area.

63. The method of claim 58 wherein the step of combining apportions heating costs between a first area including the first heat exchange and a second area including the second heat exchange as a function of an energy cost for the plurality of units.

64. The method of claim 59 further including further steps of sensing and further steps of adjusting each corresponding to a plurality of further probes and a plurality of further heat exchangers, and wherein the step of combining further combines results of the further steps of adjusting to apportion heat used in the first, second, and further heat exhanges.

* * * * *